United States Patent [19]
Allen et al.

[11] Patent Number: 5,940,614
[45] Date of Patent: Aug. 17, 1999

[54] HYPERTEXT CONTROL METHOD AND APPARATUS FOR DISPLAYING HELP INFORMATION IN AN INTERACTIVE DATA PROCESSING SYSTEM

[75] Inventors: Paul V. Allen; Charles Michael Carroll; Edward Alan Fishel, all of Rochester, Minn.

[73] Assignee: International Business Machines Corporation, Armonk, N.Y.

[21] Appl. No.: 07/690,177

[22] Filed: Apr. 18, 1991

[51] Int. Cl.⁶ .................................................. G06F 3/14
[52] U.S. Cl. .................... 395/701; 395/703; 395/685; 707/501; 345/357
[58] Field of Search .................... 395/650, 700, 395/701, 703, 685

[56] References Cited

U.S. PATENT DOCUMENTS

| | | | |
|---|---|---|---|
| 4,964,077 | 10/1990 | Eisen et al. | 364/419 |
| 5,175,812 | 12/1992 | Krieger | 395/156 |
| 5,204,947 | 4/1993 | Bernstein et al. | 395/157 |

OTHER PUBLICATIONS

"Hypertext: An Introduction and Survey", J. Conklin, IEEE Sep. 1987 pp. 17–41.
Communications of the Association for Computing Machinery, vol. 33, No. 3, Mar. 1990, pp. 296–310, J. Nielsen: The Art of Navigating (through Hypertext).
Computer, vol. 21, No. 1, Jan. 1988, pp. 81–96; N. Yankelovich et al: Intermedia: The concept and the construction of a seamless information environment.

*Primary Examiner*—Kevin A. Kriess
*Assistant Examiner*—John Q. Chavis
*Attorney, Agent, or Firm*—Joan Pennington

[57] ABSTRACT

A hypertext network and a method for displaying user selectable information modules in a hypertext network are provided for use in an interactive data processing system. The hypertext network includes a plurality of user selectable information modules. At least some of the modules include a link reference phrase to an other user selectable target module. Responsive to a user selection input, a link reference phrase to an other user selectable target module is identified in a selected information module. The availability of the other user selectable target module corresponding to the identified link reference phrase is determined and the identified reference phrase link is selectively activated or deactivated responsive to the determined availability of other user selectable target module. The identified reference phrase link can be selectively activated or deactivated based upon user class or user authority. A corresponding target module can be selected responsive to an identified user class or user authority.

11 Claims, 2 Drawing Sheets

Fig-4
/30

```
.................................................
:                    Objects — 34                :
:                                                :
: On the AS/400 system, an object consists of a named storage :
: space consisting of a set of characteristics describing itself, :
: and in some cases, data. Commands exist on the system which :
: allow you to work with objects.                :
:                                         Bottom :
: F2=Extended help   F10=Move to top   F11=Search index :
: F12=Cancel         F13=User support  F24=More keys :
:................................................:
```

Fig-5
/30

```
.................................................
:                    Objects — 34                :
:                                                :
: On the AS/400 system, an object consists of a named storage :
: space consisting of a set of characteristics describing itself, :
: and in some cases, data. Commands exist on the system which :
: allow you to   work with objects. — 36        :
:                                         Bottom :
: F2=Extended help   F10=Move to top   F11=Search index :
: F12=Cancel         F13=User support  F24=More keys :
:................................................:
```

Fig-6
/30

```
.................................................
:              Work with Object Command — 34     :
:                                                :
: The work with object (WRKOBJ) command...       :
:                                                :
:                                                :
:                                                :
:                                         Bottom :
: F6=Viewed topics   F10=Move to top   F11=Search index :
: F12=Cancel         F13=User support  F24=More keys :
:................................................:
```

HYPERTEXT CONTROL METHOD AND APPARATUS FOR DISPLAYING HELP INFORMATION IN AN INTERACTIVE DATA PROCESSING SYSTEM

BACKGROUND OF THE INVENTION

1. Field of the Invention

The invention relates generally to interactive data processing systems, and more particularly to a hypertext control method and apparatus for manipulation of help information displayed in an interactive data processing system.

2. Description of the Prior Art

Computers often include on-line interactive learning functions to facilitate ease of learning for users of one or many computer programs or applications. Many computer systems have adopted a hypertext network or a help/dialog approach which gives the user display screens of help/dialog information for specific applications selected by the user. The hypertext network is a non-sequential approach for on-line presentation of help information or text to describe a selected term or concept. A choice of several options of information or text associated with particular hypertext reference phrases is provided to the user. Typically the user controls the particular hypertext screen to be displayed by selecting a hypertext reference phrase from a current hypertext screen. Then the next hypertext screen displays text associated with the selected hypertext reference phrase and additional reference phrases from which a next selection can be made. The hypertext screens are connected by directed links.

A difficulty for the user with the conventional hypertext arrangement is that hypertext reference phrases are displayed as options when the target hypertext screens have not been installed on the system. As a result the user is allowed to select useless links to empty or nonexistent target modules.

Also the conventional hypertext arrangement does not provide an effective way to display different hypertext information or different target modules based upon class or authority of the user. A programmer may need to see more detailed information than a system operator or other user; however, in the conventional hypertext arrangement the same help information associated with particular hypertext reference phrases is displayed for all users.

U.S. Pat. No. 4,964,077 discloses a technique for automatically adjusting help information displayed in an on-line interactive data entry data processing system. The disclosed system tracks the number of times a user has invoked a help/dialog function, compares that number with a threshold value and then displays less help/dialog information to the user. The disclosed system builds a data base of help/dialogs which are uniquely addressed by the functional area and skill level of the individual user as tracked by the number of times the user has been through the help/dialog for a particular functional area. While the disclosed technique provides improvements, the above-described disadvantages of the conventional hypertext arrangement remain.

SUMMARY OF THE INVENTION

Important objects of the present invention are to provide a hypertext control method and apparatus for displaying help information in an interactive data processing system overcoming disadvantages of hypertext networks and help/dialog arrangements used in the past; to provide a hypertext control method and apparatus in which a hypertext link reference phrase is selectively activated and deactivated to enable the user to effectively and efficiently access help information; to provide a hypertext control method and apparatus in which different hypertext information or different target modules are displayed based upon a user class or authority; and to provide an improved user interface for a hypertext network to facilitate ease of learning for different classes of users and to avoid useless links to empty or nonexistent target modules.

In brief, the objects and advantages of the present invention are achieved by a hypertext network and a method for displaying user selectable information modules in a hypertext network used in an interactive data processing system. The hypertext network includes a plurality of user selectable information modules. At least some of the modules include a link reference phrase to an other user selectable target module. Responsive to a user selection input, a link reference phrase to an other user selectable target module is identified in a selected information module. The availability of the other user selectable target module corresponding to the identified link reference phrase is determined and the identified link reference phrase is selectively activated or deactivated responsive to the determined availability of other user selectable target module. The identified link reference phrase can be selectively activated or deactivated based upon user class or user authority. A corresponding target module can be selected responsive to an identified user class.

BRIEF DESCRIPTION OF THE DRAWING

The present invention together with the above and other objects and advantages may best be understood from the following detailed description of the embodiment of the invention illustrated in the drawings, herein:

FIGS. 4, 5 and 6 are illustrations of hypertext screens together illustrating the operation of the present invention.

DETAILED DESCRIPTION OF THE PREFERRED EMBODIMENT

Figure 1:
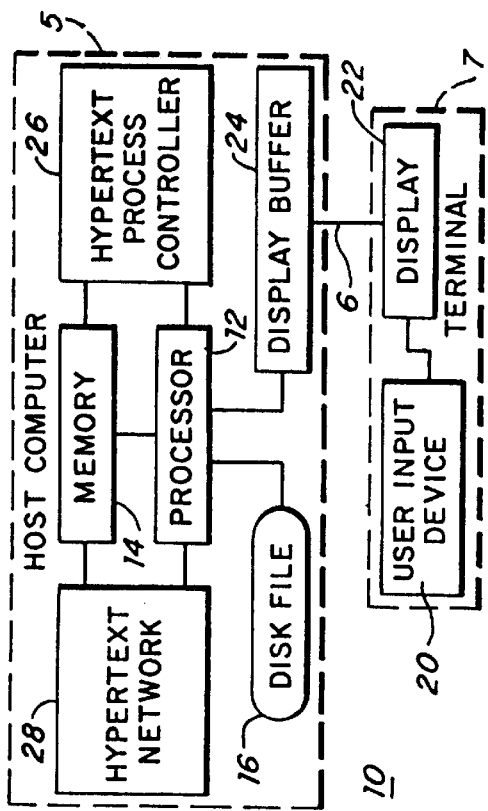
FIG. 1 is a block diagram representation of a computer or data processing system embodying the present invention.

FIG. 1 shows a block diagram of computer system 10 of the invention. Computer system 10 consists of host computer 5 and terminal 7. Host computer 5 contains processor 12 connected to memory 14, hypertext network 28, hypertext process controller 26, disk file 16, and display buffer 24. Display buffer 24 is connected via line 6 to display 22 of terminal 7. User input device 20 is connected to display 22. In the preferred embodiment, host computer 5 is an IBM Application System/400 Midrange computer, terminal 7 is an IBM 5250 non-programmable display terminal, display buffer 24 is an IBM Workstation I/O Processor, Type 6040, and hypertext process controller 26 is the user interface management (UIM) support facility of the AS/400.

In an alternate embodiment, computer system 10 is an IBM PS/2 computer. In this alternate embodiment, both host computer 5 and terminal 7 may be contained in the same physical package. Other alternate embodiments are possible and fall within the spirit and scope of the invention.

Figure 2:
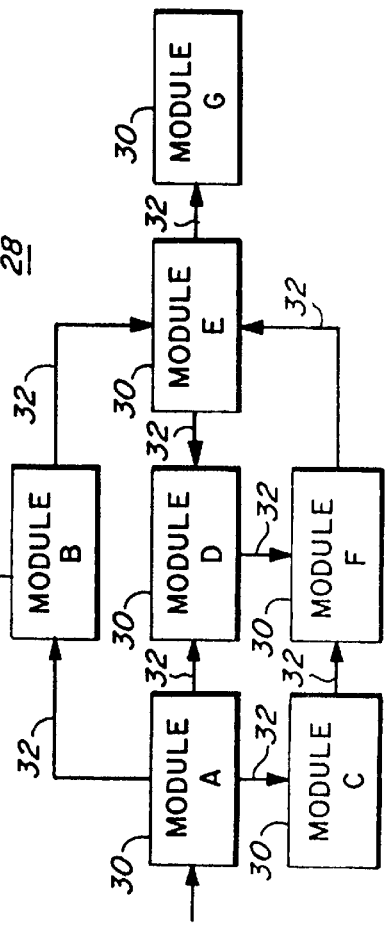
FIG. 2 is a truncated block diagram illustrating a hypertext network of FIG. 1.

In FIG. 2 there is shown a truncated block diagram illustrating the hypertext network 28 including a plurality of help modules A-G designated as 30 stored on a data storage medium. Each help module 30 serves as a node in the hypertext network 28. A plurality of arrows 32 represent predefined user selectable hypertext links to other target modules or nodes 30 selected by a user to access a particular MODULE A-G of the help modules 30 of the hypertext network 28. As shown in FIG. 2, predefined static hypertext links 32 exist from MODULE A to MODULE B to MODULE E to MODULE D to MODULE F to MODULE E.

In accordance with the present invention, predefined user selectable hypertext links 32 are deactivated when the target module 30 is not installed on the system or the user is not authorized to use the target module. A plurality of stored target modules are associated with the predefined user selectable hypertext links 32 which are selectively displayed to an individual user based on user class, user authority to target modules or the existence of a target module on the system. User classes include various skill levels, such as, beginner, intermediate, expert, and other classes, for example, such as, security officer (SECOFR), security administrator (SECADM), programmer (PGMR), system operator (SYSOPR), or a user (USER). A conditional hypertext link definition tag of the invention follows:

```
:LINK
     PERFORM = 'action-text'
     [UNLESSn = 'conditional-expression']
     [THENDOn = 'action-text']
     [LINKWHEN = 'conditional-expression'].
     n = 1 through 4
:
- Reference phrase text
:
:ELINK.
``` where :LINK identifies the text reference phrase and indicates the operation to be performed as a static hypertext link when the reference phrase text is selected by the user.

PERFORM='action-text' specifies the action that is to occur when the reference phrase is selected and all of the condition-expressions for the UNLESSn attributes have evaluated to false. For example, a valid form of action-text is 'DSPHELP help-module-name [panel-group-name]'.

Both UNLESSn='conditional-expression' and LINKWHEN='conditional-expression' identify one or more optional conditions.

THENDOn='action-text' specifies the action that is to occur when the reference phrase is selected and the conditional-expression for the corresponding UNLESSn attribute is evaluated to true and all the conditional expressions for the lower numbered UNLESSn attributes have evaluated to false. When used, the UNLESSn and THENDOn attributes are structured or coded as pairs.

The expressions for the UNLESSn attributes are evaluated in numerical order and if one evaluates to true the corresponding THENDOn action is performed and all higher numbered UNLESSn and THENDOn attributes as well as the PERFORM attribute are ignored. The set of conditions that can be formed with the LINKWHEN attribute can be identical to the set of conditions that can be formed with the UNLESSn attributes; however, the significance of those conditions is different. The LINKWHEN attribute is used to activate or deactivate the LINK tag while the UNLESSn attributes are used to select the action to be performed when an active LINK tag is selected.

Figure 3:
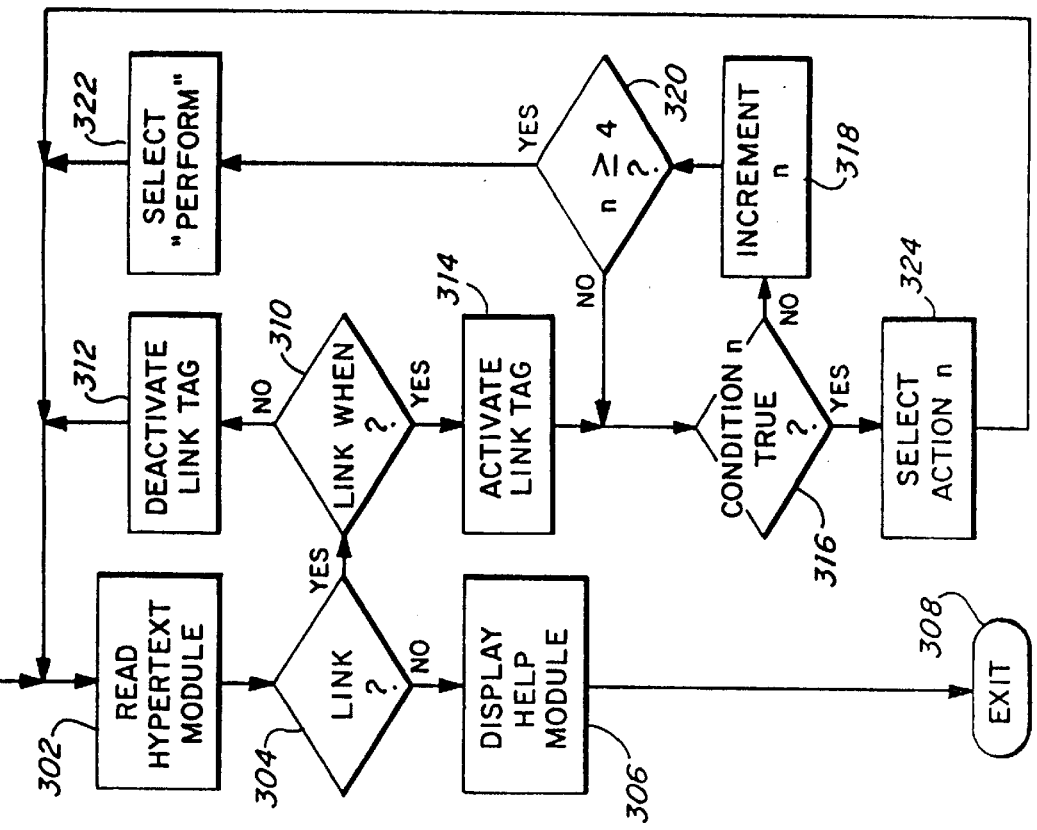
FIG. 3 is a logic flow diagram illustrating the hypertext control method and conditional apparatus of the present invention.

FIG. 3 illustrates a logic flow diagram of the hypertext control method and conditional logic apparatus of the present invention. The sequential logic operations begin as indicated at a block 300 with accessing the hypertext network 28. As indicated at a block 302, a user selected hypertext module is read. A reference phrase is identified in the user selected hypertext module as indicated at a decision block 304. When a hypertext reference phrase is not identified, then the target module 30 associated with the selected reference phrase is displayed as indicated at a block 306. Then the control procedure is exited as indicated at a block 308. When a link reference phrase for the selected module 30 is identified, as indicated at a decision block 310, then (LINKWHEN) conditional functions are evaluated. When a LINKWHEN conditional function evaluates to false, then the link reference phrase is deactivated as indicated at a block 312. Then the sequential operations return to block 302 for reading and processing all static links within the selected module. Otherwise when the LINKWHEN conditional function evaluates to true, then the link reference phrase is activated as indicated at a block 314.

Then (UNLESSn) conditional functions condition$_n$ are evaluated in numerical order as indicated at blocks 316, 318 and 320. As shown in block 320, allowed values for n are 1 through 4. When an n greater than 4 is identified at block 320, then (PERFORM) is selected as indicated at a block 322. When a condition$_n$ evaluates to true, then a corresponding (THENDOn) action$_n$ is selected as indicated at a block 324. Then the sequential operations return to block 302 for reading and processing all static links within the selected module.

A conditional-expression for UNLESSn and LINKWHEN conditional functions can be defined by AND/OR logic or built-in functions of hypertext process controller 26 in accordance with the following grammar:

| | |
|---|---|
| expression | : := term |
| | : := expression *OR term |
| term | : := factor |
| | : := term *AND factor |
| factor | : := function |
| | : := ( expression ) |
| | : := *NOT ( expression ) |
| function | : := function-id ( arg-list ) |
| | : := function-id |

For example, a check object CHKOBJ(object-name,object-type[,authorities]) built-in function evaluates true if the object is found on the system and the user possesses at least the level of authorization to the object specified on the function. When a level of authorization is not specified, then the check object function provides only the object existence check. A check user class CHKUSRCLS(user-class) built-in function evaluates true if the user has at least the level of user class specified on the function.

Referring to FIGS. 4–6, hypertext screens for help modules 30 are shown to illustrate the hypertext dynamic display control procedure of the invention. Each help module 30 is a variable length information record including a predefined descriptive header or title 34, such as Objects shown in FIGS. 4 and 5. Each hypertext link reference phrase is displayed as highlighted text that is underscored on a monochrome display or displayed as yellow text that is underscored on a color display. The user presses the TAB key to move the cursor to a particular displayed link reference phrase and then presses the ENTER key to display the hypertext associated with the selected reference phrase.

In FIG. 5, a highlighted user selectable hypertext link or activated link reference phrase 36 of work with objects is shown. As illustrated in FIG. 4, the work with objects text is not highlighted and the hypertext link is not activated and is not available for user selection, for example, because the target module is not installed on the system or because the target module is not available to the user class.

FIG. 6 illustrates a displayed screen having a descriptive header 34 of Work with Object Command that can be selected by the user, for example, using the TAB key to move the cursor to the Work with Object link in the Objects module screen display of FIG. 5, then the ENTER key is pressed. One of a plurality of stored target screens can be displayed to provide different text information based on user class, user authority to target modules or the existence of a target module on the system.

What is claimed and desired to be secured by Letters Patent of the United States is:

1. A hypertext network for use in an interactive data processing system including a processor device, a memory, a user input device and a display comprising:

means for storing a plurality of user selectable information modules, at least some of said modules including a link reference phrase to a user selectable target module;

means responsive to a user selection input of an information module for identifying a link reference phrase to a user selectable target module in said user selected information module;

means responsive to said identifying means for evaluating a first conditional function and for activating or deactivating said identified link reference phrase responsive to said evaluated first conditional function; and means responsive to said first conditional function evaluating means for displaying said user selected information module with said activated or deactivated link reference phrase.

2. A hypertext network as recited in claim 1 further comprising means responsive to an identified link reference phrase for evaluating a second conditional function and for selecting a corresponding target module responsive to said evaluated second conditional function.

3. A hypertext network as recited in claim 2 wherein said second conditional function evaluating means include means for identifying a user class of the user and conditional logic means for selecting a corresponding target module responsive to said identified user class.

4. A hypertext network as recited in claim 1 wherein said first conditional function evaluating means include conditional logic means for deactivating said identified link reference phrase when said user selectable target module is unavailable on the system.

5. A hypertext network as recited in claim 1 further comprising means for identifying a user class of the user and wherein said first evaluating means include conditional logic means for deactivating said identified link reference phrase when said user selectable target module is unavailable to said identified user class.

6. A hypertext network as recited in claim 1 wherein a deactivated link reference phrase is unavailable for user input selection.

7. A method for displaying user selectable information modules in a hypertext network for use in an interactive data processing system, the hypertext network including a plurality of user selectable information modules, at least some of said modules including a link reference phrase to an other user selectable target module, said method comprising the steps of:

identifying responsive to a user selection input a link reference phrase to an other user selectable target module in a selected information module;

determining the availability of said other user selectable target module corresponding to said identified link reference phrase;

selectively activating or deactivating said identified link reference phrase responsive to said determined availability of said other user selectable target module; and displaying said selected information module with said activated or deactivated link reference phrase.

8. A method for displaying user selectable information modules as recited in claim 7 wherein said step of determining the availability of said other user selectable target module includes the steps of identifying a user class of the user and selectively activating or deactivating said identified link reference phrase responsive to said identified user class.

9. A method for displaying user selectable information modules as recited in claim 7 wherein a plurality of said other user selectable target modules are stored, each corresponding a user class.

10. A method for displaying user selectable information modules as recited in claim 9 further includes the steps of identifying a user class of the user and selecting said other user selectable target module responsive to said identified user class.

11. A hypertext network for use in an interactive data processing system including a processor device, a memory, a user input device and a display comprising:

means for storing a plurality of user selectable information modules, at least some of said modules including a link reference phrase to a user selectable target module;

means responsive to a user selection input of an information module for identifying a reference phrase link to a user selectable target module in said selected information module;

first conditional logic means responsive to said identifying means for selectively activating or deactivating said identified link reference phrase; and second conditional logic means responsive to said identifying means for selecting one of a plurality of corresponding stored target modules.

* * * * *